United States Patent [19]

Waldron, III

[11] Patent Number: 5,428,789

[45] Date of Patent: Jun. 27, 1995

[54] METHOD AND APPARATUS FOR OPTIMIZING USER RESPONSE TIME IN A PRIORITY PREEMPTIVE OPERATING SYSTEM

[76] Inventor: Theodore C. Waldron, III, 1650 NW. 59th Way, Sunrise, Fla. 33313

[21] Appl. No.: 112,239

[22] Filed: Aug. 27, 1993

[51] Int. Cl.$^6$ .................................................. G06F 9/46
[52] U.S. Cl. ............................. 395/700; 364/DIG. 1; 364/280.8; 364/281.7; 364/281.8
[58] Field of Search ................... 364/DIG. 1 MS File; 395/650, 700

[56] References Cited

U.S. PATENT DOCUMENTS

| | | | |
|---|---|---|---|
| 4,642,756 | 2/1987 | Sherrod | 364/DIG. 1 |
| 4,974,159 | 11/1990 | Hargrove et al. | 364/DIG. 1 |
| 5,012,409 | 4/1991 | Fletcher et al. | 364/DIG. 1 |
| 5,247,675 | 9/1993 | Farrell et al. | 364/DIG. 1 |

Primary Examiner—Thomas M. Heckler
Attorney, Agent, or Firm—Staas & Halsey

[57] ABSTRACT

A method in a computer system providing user control over application completion performance and recovering lost computational cycles incurred while running pooling and non-pooling applications concurrently in a priority preemptive operating system. The method and apparatus of the present invention includes identifying the various priority levels in a priority preemptive operating system and providing an automated method for selecting said levels. After the user selection is completed, a scan is conducted to ensure that the selected level will execute prior to starting the application. If the user selected level is too low to execute, a minimum priority level is automatically determined to ensure that the application can execute without delay. The resulting priority is then continuously visually displayed to inform the user of each applications execution eligibility.

10 Claims, 7 Drawing Sheets

PRIORITY SCANNING LOGIC

METHOD AND APPARATUS FOR OPTIMIZING USER RESPONSE TIME IN A PRIORITY PREEMPTIVE OPERATING SYSTEM

BACKGROUND OF THE INVENTION

1. Field of the Invention

The present invention relates in general to the exploitation of priority preemptive systems supporting Round-Robin scheduling policies and in particular to overcoming computational loses incurred during the concurrent execution of pooling and non-pooling algorithms. Still more particularly, the present invention relates to the automatic determination of a minimum useable user priority level. Finally, the present invention relates to a system and method for combining the concepts of recovered computational cycles and automatic minimum useable priority level with a visual display of the associated effective priority to an end user.

2. Description of the Prior Art

Early desktop computers employed a simple single tasking strategy as is the case with the Disk Operating System (DOS). Many applications that were written to run on this operating system were designed to consume every available computational cycle. This typically involved an infinite loop that would check for input from the keyboard or a communications port. This is commonly referred to as "pooling". It is generally accepted that no useful work is accomplished during pooling when no input is provided. Such would be the case when the user of the application pauses to think. As the development of operating systems designed to run on desktop computers evolved, many such applications could appear to run simultaneously by giving each application a small time slice of execution and running them one after another. This is referred to as "round-robin" scheduling. Modern desktop computer operating systems create a hierarchy of priority levels in which the highest priority schedulable unit is run ahead of all others. This is referred to as priority preemptive scheduling. In the event that there are two or more schedulable units of the same priority they will processed in a round-robin fashion. Applications that are written to run on priority preemptive operating systems are designed to voluntarily relinquish processor control after a specified time limit or in response to system events. These are referred to as "well behaved" applications. Operating systems are never aware of what the application will do and must handle all cases.

A problem presents itself when running the older DOS type pooling applications concurrently with the newer well behaved applications on a priority preemptive operating system such as IBM's OS/2. If the DOS type applications are higher in priority than the well behaved applications, then the well behaved applications will never get to run. If the well behaved applications are higher in priority than the DOS applications, then the DOS applications will only run when the well behaved applications relinquish the processor. The problem would be compounded when there are many well behaved applications such that they completely consume the processor bandwidth. In that event, the DOS applications would never get to run. OS/2 attempts solves this problem by utilizing a default priority level common to both the DOS type of applications and the well behaved applications. Additionally, complex set of controls governing the DOS application's processor consumption is provided. Since using these controls varies with the relative wide range of computing power available to desktop computers, the default levels are inherently suboptimal. Stated in another manner, by running both types of applications at the same priority level, there will be many processor cycles lost due to the pooling nature of the DOS applications. The problem intensifies when such applications are run on very fast computing machines such as the Intel i486 or Pentium processor. This is due to the fact that a small time slice of execution is given to each schedulable unit. In the case of an Intel i386DX 16 Mz machine given 32 milliseconds to execute the pooling loop it can safely be assumed that all computational cycles will be lost. Since an Intel i386DX 33 Mz machine is approximately twice as fast, twice the number of computational cycles will be lost. Since an Intel i486DX 33 Mz is again twice as fast, twice the number of computational cycles is lost again. Since an Intel i486DX 66 Mz machine is again approximately twice as fast, twice the number of computational cycles is lost again. Therefore, it is reasonable to assume that the computational looses of executing a pooling loop from a DOS type of application on an Intel i486DX 66 Mz machine is 8 times as great as the loses incurred on an Intel i386DX 16 Mz machine. Processors such as the Intel Pentium and future more powerful processors will be subjected to this phenomenon lost processor cycles to an even greater degree.

Priority preemptive operating systems containing many levels of priority typically employ a concept of foreground and background processing. Generally, there is a single foreground process which is higher in priority than all other processes which are the background processes. These background processes in many scenarios share the same priority level and thus are subjected to round-robin scheduling policies. In effect, this may result in a two level prioritization scheme regardless of the number of priority levels actually supported.

Scheduling policies are inherently tied to the memory management method. Intel processors i386 and beyond support virtualized memory management. This allows the operating systems to execute applications whose memory requirements exceed that of the actual physically configured memory. When a request for memory exceeds that of available memory, infrequently accessed portions of the programs in memory are rolled out to the hard disk. This will free the memory for the currently executing application. Code and data that is in memory can be accessed at the speed of the processor which is in the nanosecond range. Disk access in the millisecond range on roughly 1000 times slower. A problem presents itself when several applications require memory and are all run at the same priority class and level in a memory constrained environment. As the applications are loaded from the disk into memory, the physical memory becomes filled. Subsequent loading of more applications will cause more of the memory to rolled out to the disk. When the applications are each executed turn, its memory (code, data and stack segments) may be required to be rolled in from the disk. When the disk read is initiated to obtain a particular memory fragment, the application is queued on a waiting list and the next application is executed. In easily reproducible scenarios severe memory overcommitment may require days to complete, whereas the same application could complete in a matter of minutes in non-memory constrained environments. Consequently, the effects of round robin scheduling on virtualized memory management systems in memory overcommit scenarios is counterproductive.

Some Priority preemptive operating systems contain a concept of a scheduling class and level. Such is the case with IBM OS/2 and Microsoft NT operating systems. Programs can be subdivided into a specific class and further subdivided into various levels. High priority programs are generally placed into a time-critical class while the lowest priority programs are placed into an idle class. Operating system developers do not disclose the actual priority class and level at which any given application executes to the end user. However, a processor utilization chart, bar, or graph is common to priority preemptive systems. When the processor utilization tool shows 100% utilization, it is not known which class or level or combination of classes and levels are consuming all processor cycles. Should a user attempt to run an application that is lower in priority than the currently executing application or applications, the application will not execute. Currently, the application is selected to be the foreground process to increase its chances to execute. However, when placed in the background, the same application may not execute. Input from the keyboard and mouse requires the application to be the foreground process. Since the foreground is higher in priority than the background, the background only receives the processor cycles not needed by the foreground application. However, there are occasions when the user would desire to have the foreground priority less than the background. Such could be the case when a user wanted to run an important application ahead of simply perusing a data file. The point is that the user perceives the background application as very important and would accept a performance loss of perusing the data file. However, the act of perusing the data file would have the higher foreground priority. Currently, this scenario is not possible given the existing priority preemptive scheduling policies.

Therefore, it should be apparent that a need exists or a system and method to overcome the lost processor cycles due to concurrent execution of pooling and nonpooling applications, and providing a user selectable prioritization scheme to overcome the thrashing effects of Round-Robin scheduling in memory overcommit scenarios.

SUMMARY OF THE INVENTION

It therefore one object of the present invention to provide a method to recover lost processor cycles due to the concurrent execution of pooling and nonpooling applications.

It is another object of the present invention to provide a method of determining the minimum available priority level of execution in a priority preemptive operating system.

It is another object of the present invention to provide a method of control ling memory overcommit thrashing scenarios by user selected prioritization of applications.

It is yet another object of the present invention to provide an improved method of displaying the user selected priority of the application.

The foregoing objects are now achieved as described. The method and apparatus of the present invention provides a method to limit the lost processor cycles due to pooling applications and to control memory overcommitment for well behaved applications. The method and apparatus of the present invention includes identifying the various priorities of a priority preemptive operating system and providing a user interface by which all priorities are selectable to the user to run various applications. The method and apparatus of the present invention further includes prescanning of a user selected priority level to ensure that the application can run and to automatically determine and provide the lowest priority level. The method and apparatus of the present invention further includes visually displaying the priority level associated with a user selection in a window or in a execution list.

The above as well as additional objects, features, and advantages of the present invention will become apparent in the following detailed description.

BRIEF DESCRIPTION OF THE DRAWINGS

The novel features believed to be characteristic of the present invention are set forth in the appended claims. The invention as well as a preferred mode of use, further objects and advantages thereof, will be best understood by reference to the following detailed description of an illustrative embodiment when read in conjunction with the accompanying drawings, wherein:

DETAILED DESCRIPTION OF THE INVENTION

Figure 1:
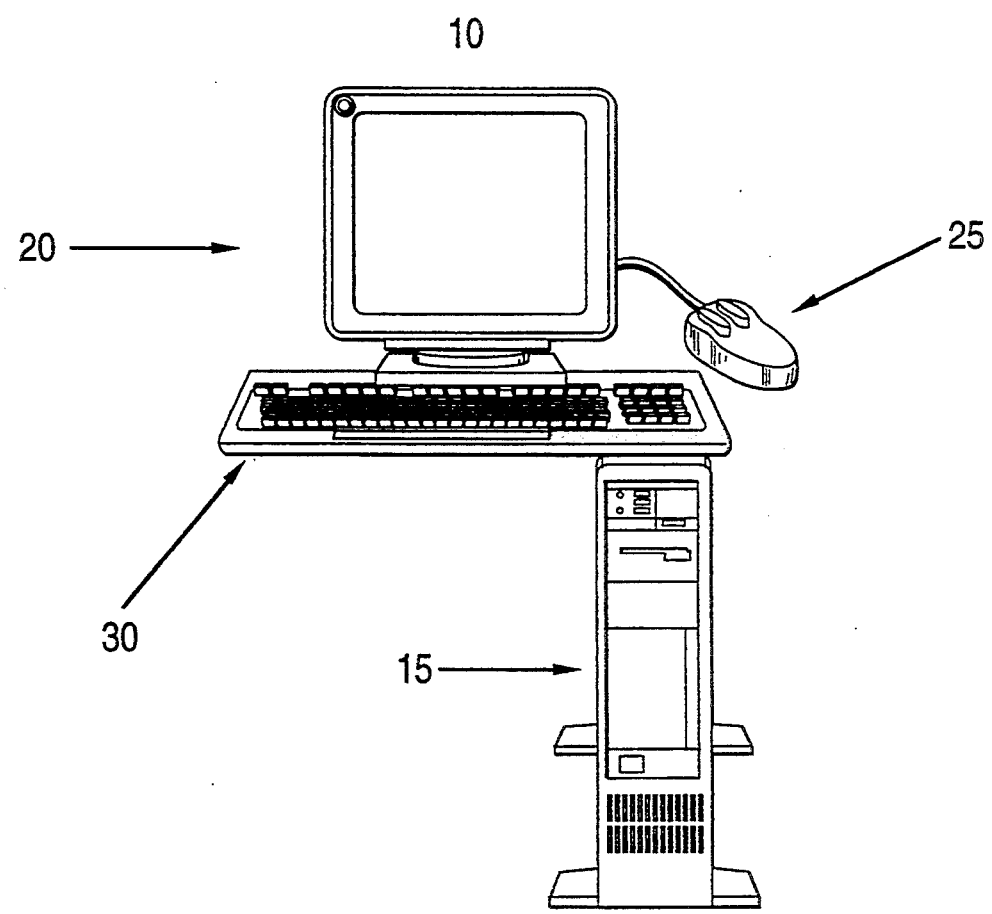
FIG. 1 depicts an example of a computer system in which the present invention may preferably be implemented.

With reference now to the figures and in particular with reference to FIG. 1, there is depicted an example of a computer system in which the present invention may be preferably implemented. This example illustrates a personal computer 10, which includes a system unit 15, a video display terminal 20, a mouse 25, and a keyboard 30. The personal computer 10 may be any suitable computer hardware such as the IBM PS/2, executing an OS/2 2.0 or higher operating system. The example computer hardware is shown only to illustrate the preferred embodiment of the present invention. The present invention is unrelated to any particular microprocessor implementation such as the Intel based microprocessors and clones or the DEC Alpha RISC based microprocessors. The present invention is also independent of the number of Central Processing Units supported by the particular hardware configuration since any number of such processors are supported. Indeed any computer hardware supporting an operating system containing priority preemptive Multitasking with or without memory virtualization can implement the objects, features, and advantages of the present invention.

Figure 2:
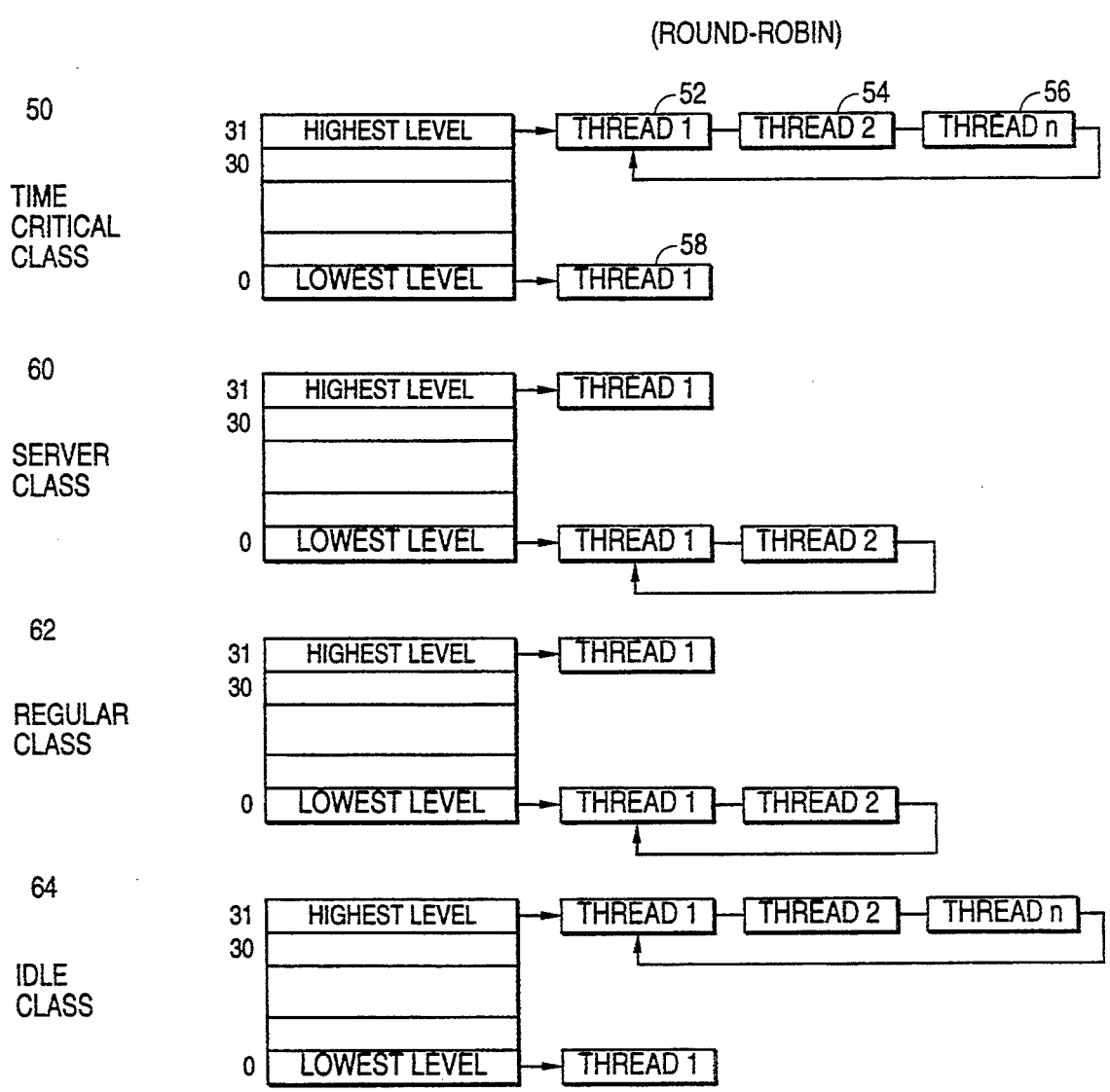
FIG. 2 depicts an example of a priority preemptive operating system supporting round-robin scheduling policies and utilizing the concepts of class and level in the preferred embodiment of the present invention.

FIG. 2 is a illustration of a priority preemptive architecture used in the preferred embodiment of the present invention that can run on the computer shown in FIG. 1. The Time Critical Priority Class 50 is the highest class in the priority preemptive architecture containing 32 sub-levels of priority. The units of scheduling are referred to as a Thread 52 which contain a code, data, and a stack segment. Since Thread 52, Thread 54, and Thread 56 are all on the same priority level, they will be run in the order 52, 54, and 56. This is again referred to as the "Round-Robin" scheduling policy. When Threads 52, 54, and 56 have either completed execution or have voluntarily relinquished processor control, Thread 58 will then run. This again is referred to as priority preemptive scheduling. This process is repeated for the 32 sub-levels in the Server Priority Class 60, the 32 sublevels in the Regular Priority Class 62, and the 32 sublevels in the Idle Priority Class 64 in that order.

There is no attempt here to claim novelty about this priority preemptive architecture. The present invention applies to any priority preemptive architecture having any number of classes and at least two levels so as to permit priority preemption and Round-Robin scheduling policies.

Figure 3:
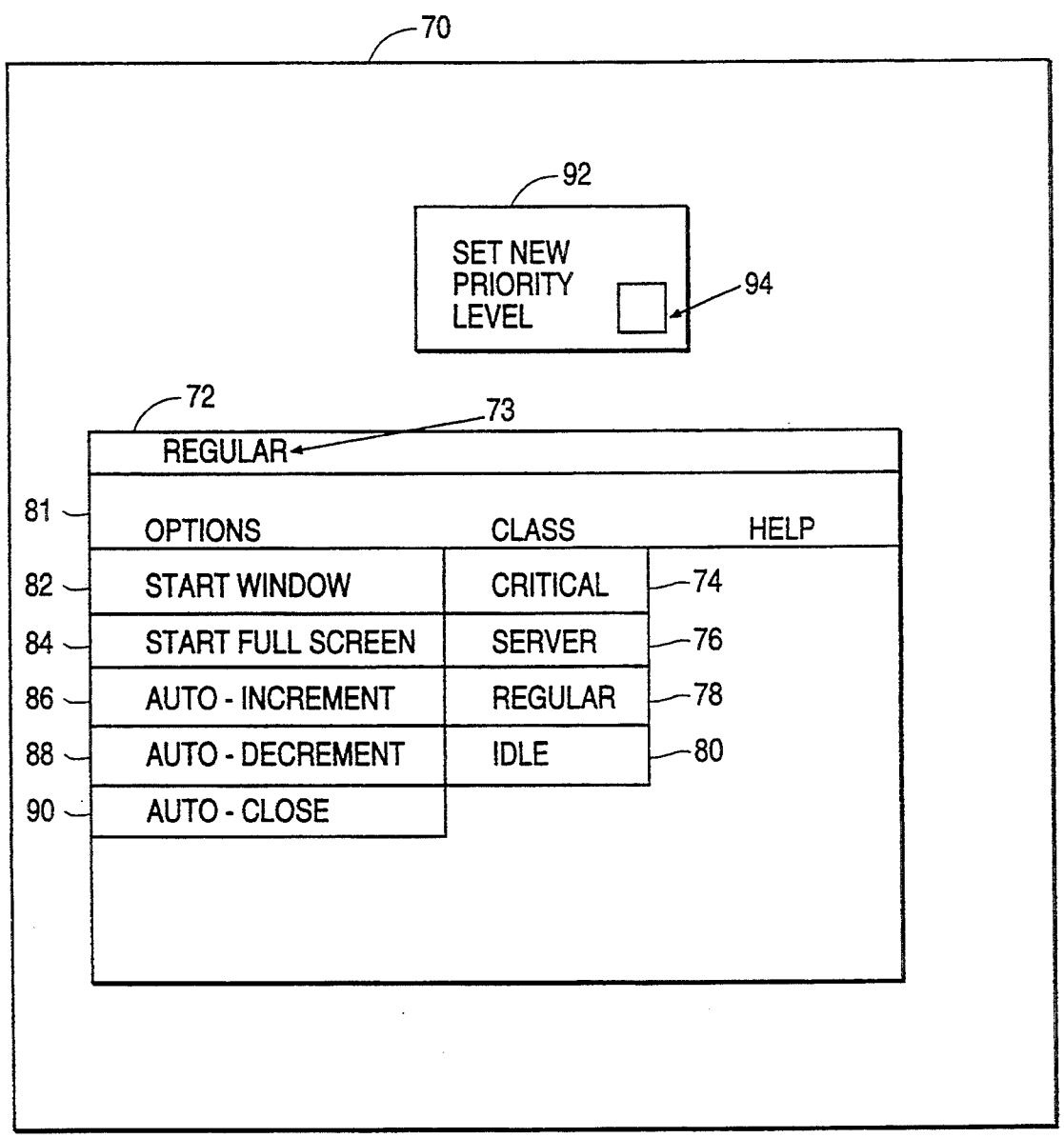
FIG. 3 illustrates the primary user Class and Priority selection methodology and the features associated with the process.

FIG. 3 depicts a computer screen illustrating the various user selections in the preferred embodiment of the present invention. Computer Video display 70 depicts a selection window 72 containing the various user options. The last selected class, Regular 73, is displayed at the top of the master window. Class options Time Critical 74, Server 76, Regular 78, or Idle 80 are selected to establish the default class of the generated Window or Full Screen, Start Window 82 or Start Full Screen 84 is selected next which generates a Set New priority Level 92 containing user priority input field 94. Once the user priority level is set a Window or Full Screen as appropriate is generated with a standard command prompt of the previously selected class and level. Auto Increment 86 and Auto Decrement 88 can be selected to avoid selecting the set new level 92 with input field 94. Auto Close 90 is selected to automatically close any Window or Full Screen sessions selected. If this option is not selected, then the appropriate Window or Full Screen sessions will not close when closing the priority selection application 72. It is important not leave any Windows or Full Screens open without applications running in them since they consume system resources.

Figure 4A:
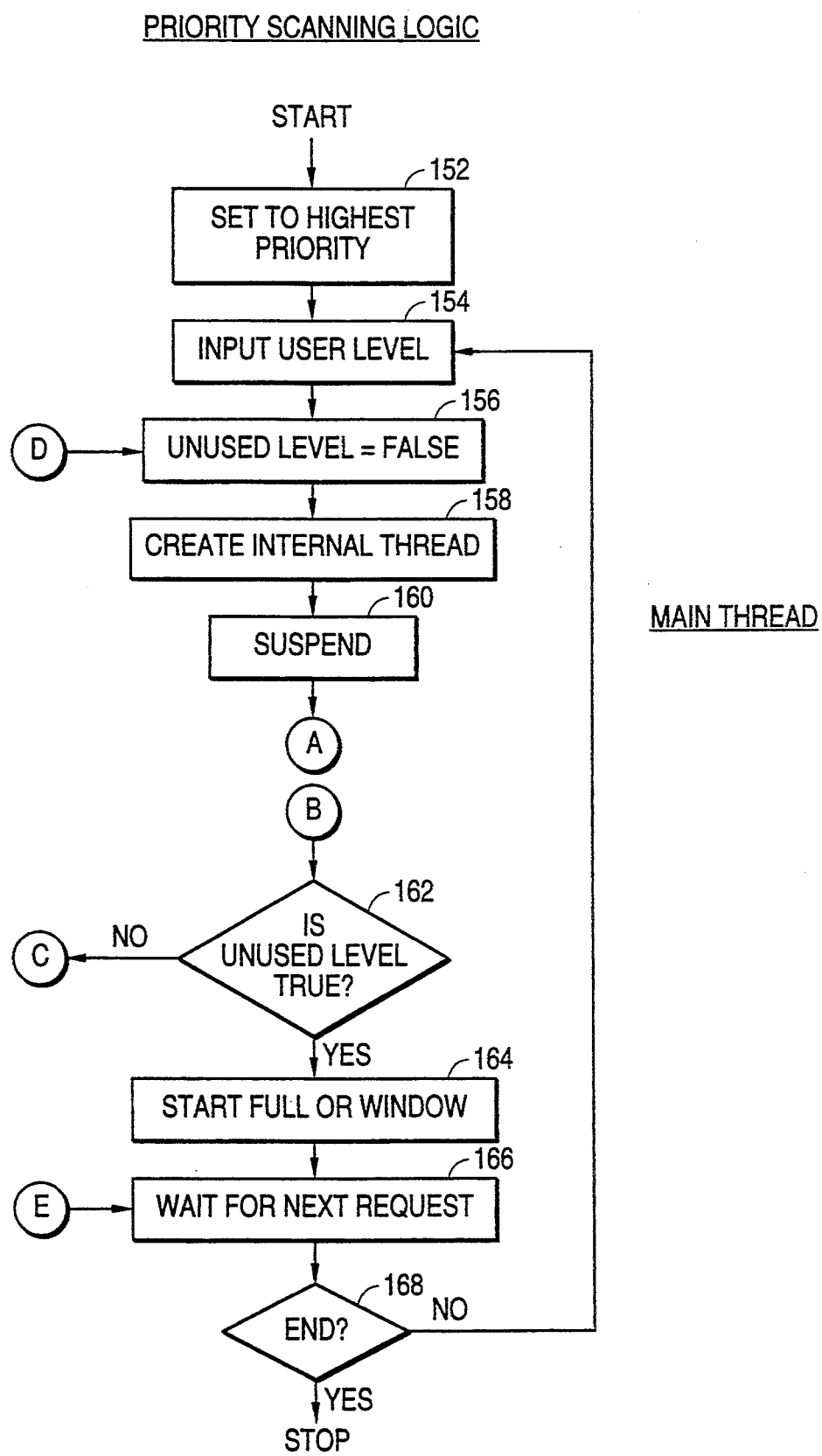
FIGS. 4A-4C are high level flow charts of a process which is used to prescan a user selected priority level and to subsequently display the results of the scan to the user in the preferred embodiment of the present invention.
Figure 4B:
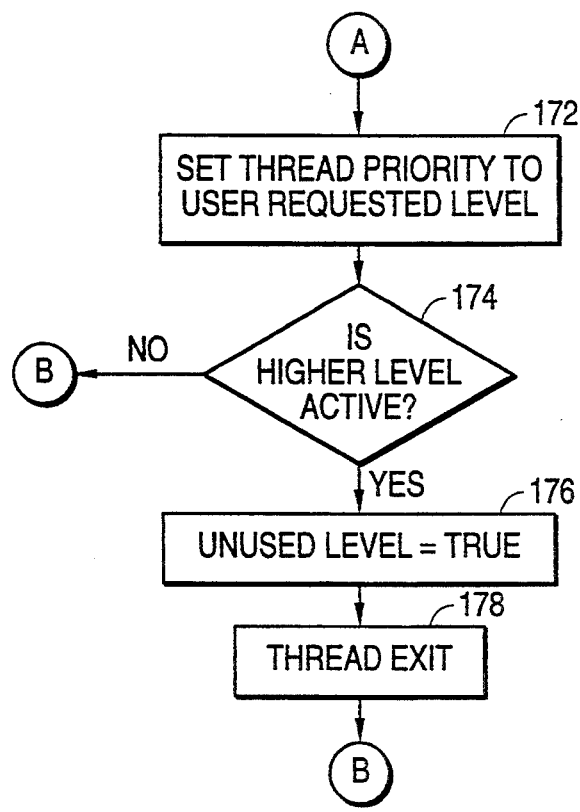
Figure 4C:
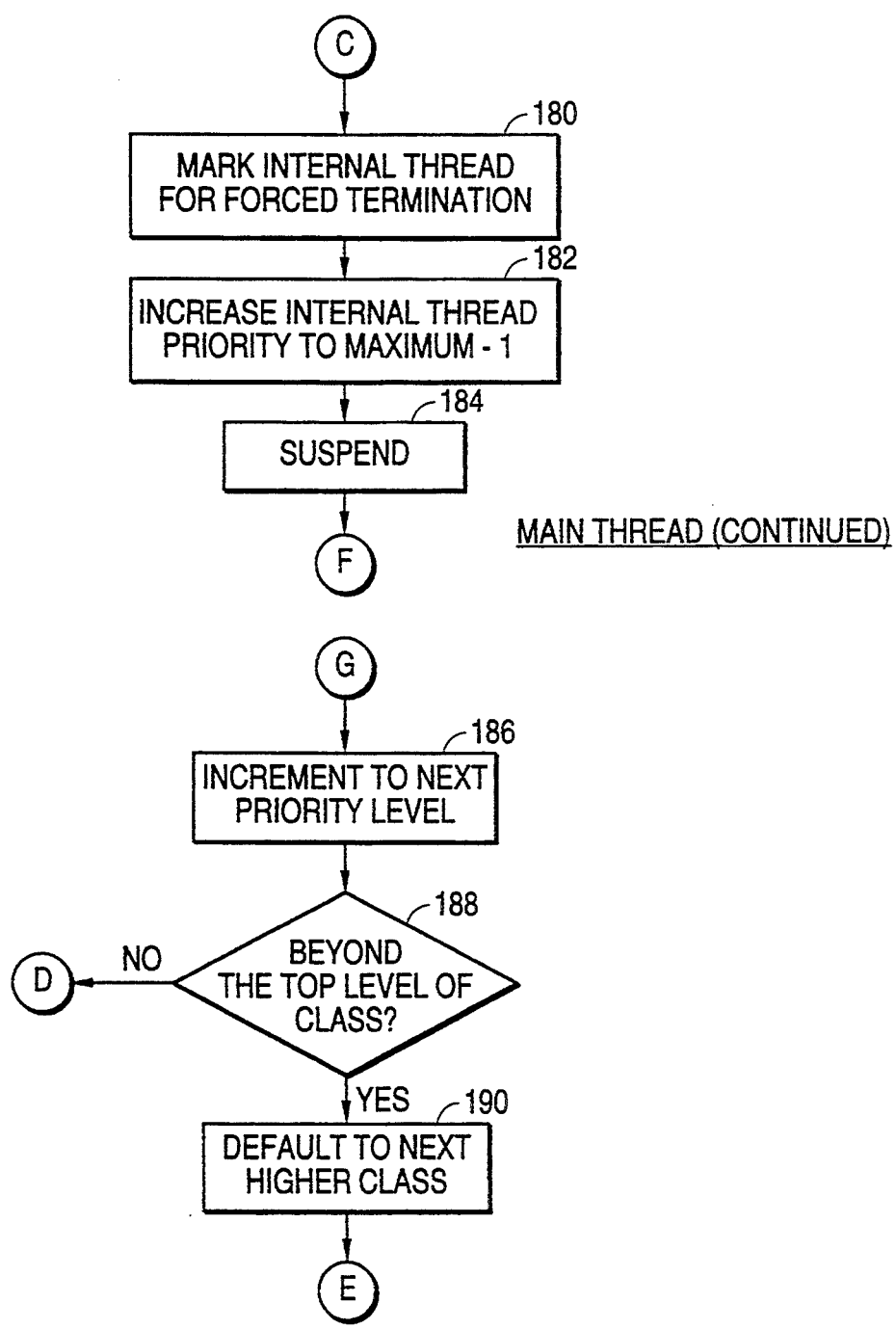

FIGS. 4A–4C are high level flow charts of the method described in FIG. 3 and in particular the method used to probe a user selected priority level after the Class is selected in a preferred embodiment of the present invention. As illustrated, the process begins at block 150 when the process described in FIG. 3 is running. The entire process will set its priority to the highest Class and Level as depicted in block 152.

Referring now to block 154 through block 192 in FIGS. 4A–4C is the process used to prescan a selected level when a Start Window 82 or Start Full Screen 84 of FIG. 3 is selected. Block 154 may be entered in any one of three states as shown in FIG. 3 blocks 82, 84, or 94. In the event of the Auto-Increment option being on as in FIG. 3 block 86 the user priority will be one greater than the last one selected and is therefore automatically set. In the event of the Auto-Decrement option being on as in FIG. 3 block 88 the user priority will be one less than the last one selected and is therefore automatically set. When neither of these options are on, the user is requested to enter a priority level as in FIG. 3 blocks 92 and 94 to satisfy the requirements of block 154 which is simply to obtain a starting priority level.

Referring now to block 156, the global value for a new LEVEL is set to FALSE. At block 158, an internal thread is created at the highest possible Class and Level. This internal thread is an independent schedulable unit using minimal system resources. The main process thread will now suspend execution as depicted in block 160. The main process thread will suspend top only a short time, as it set a timer to awaken it in one time slice. In the preferred embodiment of the present invention, this duration is only 33 milliseconds. A new thread to run must now be selected.

Since the internally generated thread is made to inherit its parent thread's priority, it is also of the highest class and level. There may be other threads at the highest class and level which may raw execute in a Round-Robin scheduling policy. Eventually, the newly created thread will execute. When the newly created thread does run it will set the priority of the new thread to the user selected Class and Level as depicted in block 172 of FIG. 4A. Recalling the method of FIG. 2, priority preemptive systems always run the highest priority schedulable unit (thread) at all times. If there is nothing to run which has a priority greater than the newly created thread as depicted in block 174 of FIG. 4A, then execution proceeds to block 174 to set the new LEVEL global value to TRUE. Otherwise, block 176 will not execute and the global LEVEL value will remain FALSE. If the new thread did run, then Block 178 will be executed which will deallocate the threads system resources. In both events, execution will continue when the timer set in block 160 (33 milliseconds) expires and block 162 queries the global LEVEL state. If the global LEVEL state is not TRUE then the user selected Class and Level were too low to execute and block 180 in FIG. 4A sets the Kill flag to prevent any more application instructions from executing. Note that this is the main program which is running at the highest Class and Level setting the Kill flag on the generated thread which is at the user selected Class and Level. The main program now sets the generated thread's priority to the highest Class and second highest level as depicted in block 182. The main program suspends or 33 milliseconds as depicted in block 184. The internal thread running at the boosted priority may now exit the system and deallocate all of its resources as depicted in block 192. It is important to note that threads do consume a considerable amount of system resources even when they do not execute and it is therefore prudent not to allow them to remain in memory when they can not execute. This becomes more important when many such threads need to be created to determine a minimum usable priority level.

When the timer expires from block 184, execution continues at block 186 to Increment the priority LEVEL as depicted in block 186. There is a test at block 188 to determine in the new level is beyond the top of the level for the selected class. When the results of the previous test are TRUE block 190 will set the user selected class to the next higher class if there is a higher class. Block 166 in FIG. 4 will then wait for the next request. Note that this indicates that all levels within the selected Class are too low in priority to execute.

Referring back to block 188 when the results of the test are FALSE, there are higher levels within the selected Class and execution continues again from block 156.

Referring back to block 162 when the new LEVEL is TRUE, block 164 will start the Window or Full Screen at the user selected priority which contains the system command prompt. The main program will then wait for the next request as depicted in block 166. Note that execution will now be transferred to the newly generated Window or Full Screen and the main process becomes the background.

When the request from block 166 is entered, a check is made to determine if it is an exit request as depicted in block 168. When the results of the check are FALSE, the process repeats for either a Window or a Full Screen starting at block 154. When the check at block 168 is TRUE, execution ends at block 170 and the program will exit from the system.

Figure 5:
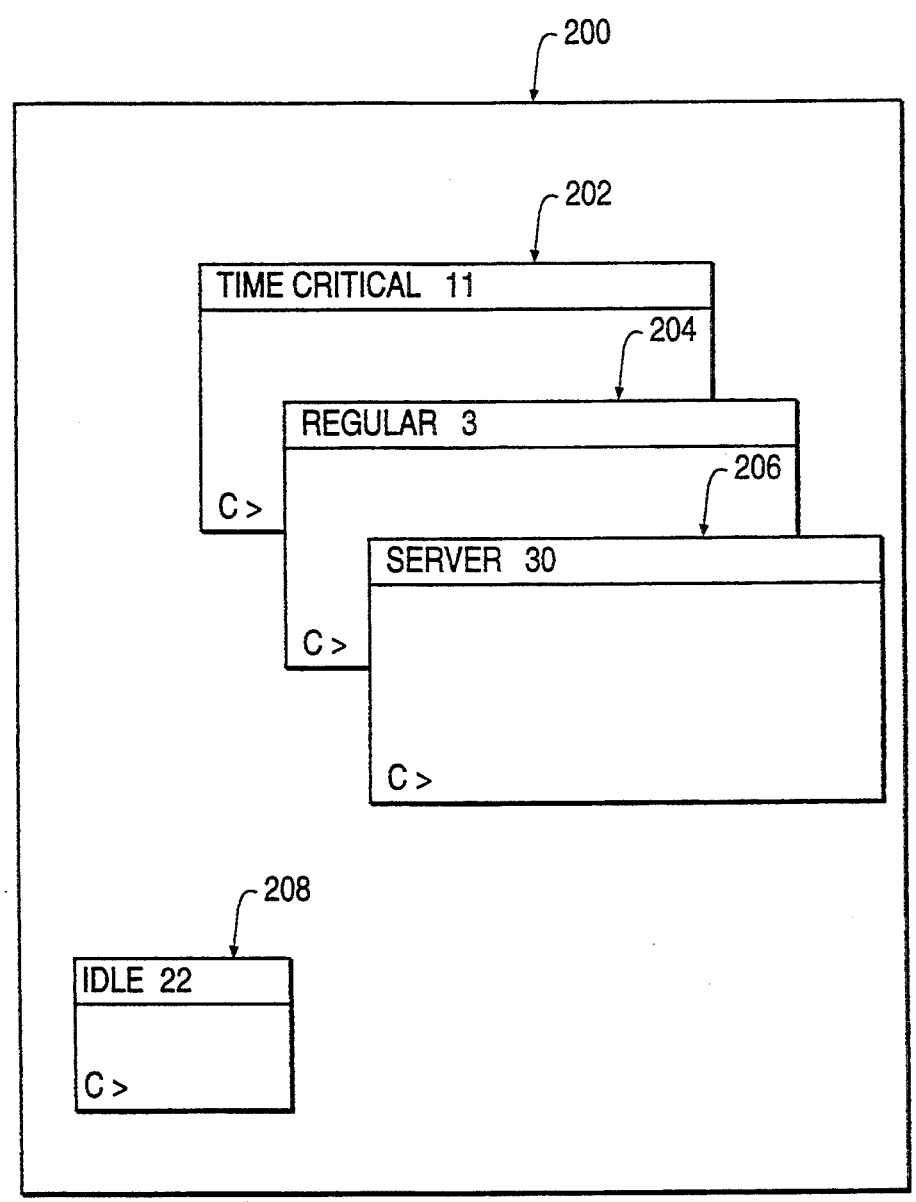
FIG. 5 is an example which illustrates the user selected priority Class and Level being visually displayed in the preferred embodiment of the present invention.

FIG. 5 depicts a computer screen illustrating multiple windows showing the associated priority class and level on the top of each Window in a preferred embodiment of the present invention. Computer Video display 200 depicts previously selected Window 202 from the selection process described in FIG. 3 containing a Class of Time Critical and a level of 11. Applications run in this particular Window may assume its Class and level priority designation. Similarly, Window 204, Window 206, and Window 208 may also assume their associated Class and Level priority designations. The visually displayed Class and Level priorities allow a user to divert processing cycles to applications independent of the applications default priorities.

What is claimed is:

1. A method for enhancing user response time in a data processing system supporting priority preemptive scheduling policies including the processing of scheduling threads, said method comprising the steps of:
   identifying priority levels supported by said priority preemptive scheduling policies;
   providing to a user of said data processing system access to said priority levels for designating running sequences of applications that are to run on said data processing system;
   determining a minimal usable priority level responsive to a user selected priority level which is too low to execute; and
   displaying the user selected priority level proximate to an application indicator of said applications to inform the user of its associated execution eligibility.

2. The method of claim 1, further comprising the step of identifying various classes of priorities and their relative execution priorities.

3. The method of claim 1, wherein said providing step further comprises the steps of:
   displaying on a display device a menu of functions and features available for user selection;
   optionally displaying various classes of priority levels; and
   optionally displaying user level help describing the system impact and interaction analysis of selecting the various priority levels in the particular priority preemptive scheduler implementation.

4. The method of claim 3, wherein said step of displaying a menu of functions and features further comprises:
   optionally starting a window in an operating system supporting multiple windows of applications wherein any applications run in said window will start execution at the user selected priority;
   optionally starting a full screen in an operating system supporting multiple full screens of applications wherein any applications run in said full screen will start execution at the user selected priority;
   optionally automatically incrementing the priority level for each new window or full screen selected in an operating system supporting multiple windows or full screens of applications;
   optionally automatically decrementing the priority level for each new window or full screen selected in an operating system supporting multiple windows or full screens of applications;
   optionally prompting the user for any given valid priority level in the absence of the automatic increment/decrement option;
   optionally automatically closing any active outstanding window or full screen sessions in an operating system supporting multiple windows or full screens of applications when the main process terminates; and
   optionally not closing any active outstanding window or full screen sessions in an operating system supporting multiple windows or full screens of applications when the main process terminates.

5. The method of claim 1, wherein said determining step a further comprises:
   setting the priority of a main process thread to the highest possible priority in a priority preemptive operating system;
   initializing a global LEVEL variable common to a main process and to any internally generated scheduling threads of said data processing system to FALSE;
   obtaining a user selected priority;
   creating an internal thread of execution which is an independent schedulable unit at the highest possible priority;
   suspending the main process thread for a small time period sufficient to allow the generated internal thread to execute;
   after being selected to run, changing the priority of the internally generated thread from the highest possible priority level to the user requested priority level;
   setting a global LEVEL variable to TRUE while at the user requested priority to indicate to the main process that the internal thread was executed;
   resuming the main process thread upon expiration of a time period at the highest possible priority level and checking the state of said global LEVEL variable; and
   if said global variable is TRUE, starting a window or full screen with a system command prompt wherein the applications will start at the user selected priority.

6. The method of claim 5, wherein said step of resuming the main process thread and checking the state of the global variable when the result is FALSE further comprises:
   sending a termination request from the main process which is at the highest possible priority level to the internally generated thread which is at the user requested level to prevent it from inadvertently setting the global variable to TRUE;
   setting the priority of the internally generated thread to the next highest level from the main process;

suspending the main process for a small time period sufficient to allow the internally generated thread to exit from the system;

resuming the main process thread upon timer expiration which is at the highest priority and increasing the user requested priority by one level;

checking in the main process if the new level is valid; and if the new level is invalid (beyond the top of the class), defaulting to the next higher class if one exists or the top class and awaiting the next priority level request.

7. The method of claim 6, wherein said checking step further comprises the steps of:

creating an internal thread of execution which is an independent schedulable unit at the highest possible priority.

8. Apparatus for enhancing processing response time in a data processing system supporting priority preemptive scheduling policies, said apparatus comprising:

means for identifying priority levels supported by the priority preemptive scheduling policies of the data processing system;

means for providing user access to said priority levels for running applications within the data processing system so that a user can set at least one priority level corresponding to an application of said running application;

means for determining a minimal usable priority level responsive to a non-usable user selected priority level which is too low to execute; and means for displaying the user selected priority level proximate to the application to inform the user of its associated execution eligibility.

9. An apparatus for allowing perception, alteration and setting of task priority levels in a priority pre-emptive operating system running on a data processing system, said apparatus comprising:

a task priority level indicator visually perceptible on a visual display device of said data processing system, said task priority indicator displaying a task priority level in accordance with policies of said priority pre-emptive operating system, said task priority level corresponding to a task running on said data processing system;

setting means for allowing a user of said data processing system to alter said task priority level to an altered priority level so as to allow said user to attempt to alter the running of said task on said data processing system.

10. The apparatus of claim 9, further comprising:

determining and resetting means for determining and resetting a new task priority level when said altered priority level causes said task to cease running and to take on a idle state on said data processing system.

* * * * *